United States Patent
Kuroda et al.

(10) Patent No.: US 7,330,416 B2
(45) Date of Patent: Feb. 12, 2008

(54) INFORMATION RECORDING MEDIUM HAVING FIRST DATA WHICH HAS BEEN DISPLACED ACCORDING TO SECOND DATA, AND INFORMATION REPRODUCING APPARATUS AND METHOD

(75) Inventors: Kazuo Kuroda, Saitama (JP); Toshio Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 476 days.

(21) Appl. No.: 10/878,682

(22) Filed: Jun. 29, 2004

(65) Prior Publication Data

US 2005/0030851 A1 Feb. 10, 2005

(30) Foreign Application Priority Data

Jun. 30, 2003 (JP) .............................. 2003-186749

(51) Int. Cl.
G11B 7/007 (2006.01)
G11B 7/004 (2006.01)

(52) U.S. Cl. ................................. 369/59.25

(58) Field of Classification Search ..................... None
See application file for complete search history.

(56) References Cited

U.S. PATENT DOCUMENTS

| 6,157,606 A * | 12/2000 | Inazawa et al. ............. 369/116 |
| 6,665,240 B1 * | 12/2003 | Kobayashi et al. ...... 369/47.15 |
| 6,735,160 B1 * | 5/2004 | Miyashita et al. ........ 369/59.12 |
| 6,801,490 B1 * | 10/2004 | Sako et al. .............. 369/53.31 |

FOREIGN PATENT DOCUMENTS

JP 2003-85896 3/2003

* cited by examiner

Primary Examiner—Andrea Wellington
Assistant Examiner—Michael V Battaglia
(74) Attorney, Agent, or Firm—Drinker Biddle & Reath LLP

(57) ABSTRACT

On a disc master DS, a record mark having a variable length according to the first data is formed at a displaced position to which the record mark is displaced, in a direction crossing the reading direction thereof, according to a wobble signal obtained by modulating the second data in a predetermined modulating method. The original data is recorded in such a manner that the original data is divided into the first data and the second data.

6 Claims, 9 Drawing Sheets

INFORMATION RECORDING MEDIUM HAVING FIRST DATA WHICH HAS BEEN DISPLACED ACCORDING TO SECOND DATA, AND INFORMATION REPRODUCING APPARATUS AND METHOD

BACKGROUND OF THE INVENTION

1. Field of the Invention

The present invention relates to an information recording medium, such as an optical disc, and an apparatus for and a method of reproducing information from the information recording medium.

2. Description of the Related Art

In an optical disc represented by a Compact Disc (CD) and a DVD, the long or short length of a pit is used to record main data. However, in order to record sub data including information for copy control for the prevention of illegal copying or the like, there is a request for reserving another recording area without decreasing a recording capacity by the pit.

As a method of increasing the recording capacity by other means except the method using the long or short length of the pit, there is known a technique of displacing or shifting the position of the pit in the radial direction of the optical disc. This technique is such that information is recorded by wobbling the position of the pit in the radial direction of the optical disc and by performing spread spectrum with respect to the wobble (e.g. Japanese Patent Application Laying Open NO. 2003-85896).

This technique is such as to perform spread spectrum with respect to predetermined data including the information for copy control by using random data to thereby generate a wobble signal, and wobble the position of a record mark according to the wobble signal. In this case, since the wobble is spread in spectrum, it is possible to increase the concealment of the predetermined data to some extent.

It is now assumed that predetermined encryption is performed to the main data and that the "key" information used for the encryption is recorded as the sub data. If the sub data is reproduced on the basis of the reproduced wobble signal, there is the possibility that the encrypted main data is easily reproduced. This causes the problem that the concealment of the main data cannot be ensured.

SUMMARY OF THE INVENTION

It is therefore an object of the present invention to provide an information recording medium which ensures the concealment of the recorded information, as well as an apparatus for and method of reproducing the information from the information recording medium, as one example.

The present invention will be explained hereinafter. An information recording medium of the present invention may be disc-shaped and may comprise various optical discs, such as a CD, a Compact Disc-Read Only Memory (CD-ROM), a DVD, and a DVD-ROM, for example.

The above object of the present invention can be achieved by an information recording medium on which first data is recorded according to a variable length of a record mark and on which the record mark is formed at a displaced position to which the record mark is displaced, in a direction crossing a reading direction, according to a signal obtained by modulating second data in a predetermined modulating method, wherein original data is recorded in such a manner that the original data is divided into the first data and the second data.

According to the information recording medium of the present invention, the record mark is formed along a circular track as a pit on the information recording medium. The first data is recorded according to the variable length (i.e. the long or short length) of the record mark. The track, in close-up, meanders or wobbles in the direction crossing a reading direction. The meandering or wobbling of the track is referred to as the "wobble" and has a shape corresponding to a signal (i.e. the wobble signal). The wobble signal can be obtained by modulating the second data in the predetermined modulating method. In other words, the record mark is formed at the displaced position to which it is displaced, in the direction crossing the reading direction, according to the wobble signal.

Into the first data and the second data, the original data is divided. Namely, in the present invention, information included in the original data is divided and recorded with mutually different physical structures, such as the variable length (i.e. the long or short length) of the record mark and the shape of the wobble. Thus, in order to reproduce the original data, it is necessary to reproduce both of the first data and the second data. Even if any one of the first data and the second data is reproduced, it is impossible to reproduce the original data. Therefore, it is possible to greatly improve the concealment of the information recorded as the original data.

In one aspect of the information recording medium of the present invention, the original data includes particular data for indicating predetermined information, and the particular data is recorded in such a manner that the particular data is divided into the first data and the second data.

According to this aspect, upon reproducing the information recording medium, if both of the first data and the second data are not reproduced, it is impossible to reproduce the particular data. Thus, it is possible to improve the concealment of the particular data included in the original data.

In this aspect, the particular data may preferably include copyright management information.

By constructing in this manner, it is possible to increase the concealment of the copyright management information.

In another aspect, the original data is divided into main data and sub data, data obtained by converting the main data on the basis of data for conversion obtained by performing a predetermined operation with respect to the sub data is recorded as the first data, and the sub data and the data for conversion are recorded as the second data.

According to this aspect, in order to reproduce the original data, firstly, it is necessary to reproduce the second data to thereby obtain the sub data and the data for conversion, and it is necessary to reproduce the first data. Moreover, if the main data cannot be obtained by reverse-converting the first data on the basis of the data for conversion, it is impossible to reproduce the original data. As described above, a process for reproducing the original data becomes more complicated, which makes it difficult to reproduce the original data. As a result, it is possible to further improve the concealment of the original data.

In this aspect, the data for conversion may preferably include at least one portion of an error-correcting code of the sub data.

By constructing in this manner, upon recording the first data and the second data, when the second data including the sub data is recorded onto the information recording medium, the error-correcting code is generated on the basis of the sub data. The first data can be obtained by converting the main data on the basis of the error-correcting code generated upon recording the second data. As described above, if the error-correcting code of the sub data is used for the data for conversion, it is possible to generate the first data after the data for conversion is obtained without any special processing, and it is possible to record the first data and the second data.

The above object of the present invention can be also achieved by an information reproducing apparatus for reproducing information recorded on the above-described information recording medium (including its various aspects), the information reproducing apparatus provided with: a reading device for reading the record mark recorded on the information recording medium; a read signal generating device for generating a read signal for indicating the variable length of the record mark on the basis of an output signal from the reading device; a first data reproducing device for reproducing the first data on the basis of the read signal; a wobble signal generating device for generating a wobble signal for indicating the displaced position of the record mark on the basis of the output signal from the reading device; a second data reproducing device for reproducing the second data from the generated wobble signal; and an original data reproducing device for reproducing the original data by using the reproduced first data and the reproduced second data.

According to the information reproducing apparatus of the present invention, it reproduces the original data from the above described information recording medium of the present invention. On the information recording medium, the first data is recorded according to the variable length (i.e. the long or short length) of a record mark. Moreover, on the information recording medium, the record mark is formed at the displaced position to which the record mark is displaced, in a direction crossing the reading direction thereof, according to a wobble signal obtained by modulating the second data in a predetermined modulating method. Furthermore, the original data is recorded in such a manner that the original data is divided into the first data and the second data.

The information reproducing apparatus provided with: the reading device; the read signal generating device; the first data reproducing device; the wobble signal generating device; the second data reproducing device; and the original data reproducing device. The reading device reads the record mark recorded on the information recording medium. The read signal generating device generates a read signal for indicating the variable length (i.e. the long or short length) of the record mark on the basis of an output signal from the reading device. The first data reproducing device reproduces the first data on the basis of the read signal. The wobble signal generating device generates a wobble signal for indicating the displaced position of the record mark on the basis of the output signal from the reading device. The second data reproducing device reproduces the second data from the generated wobble signal. The original data reproducing device reproduces the original data by using the reproduced first data and the reproduced second data. According to the information reproducing apparatus, it is possible to reproduce the original data by combining the reproduced first data and the reproduced second data.

In one aspect of the information reproducing medium, the information recording medium, the original data is divided into main data and sub data, data obtained by converting the main data on the basis of data for conversion obtained by performing a predetermined operation with respect to the sub data is recorded as the first data, and the sub data and the data for conversion are recorded as the second data, and the original data reproducing device is provided with: a reverse-converting device for reverse-converting the reproduced first data to thereby generate the main data by using the data for conversion extracted from the reproduced second data; and an original data generating device for generating the original data by using the sub data extracted from the reproduced second data and the reverse-converted main data.

According to this aspect, by the information reproducing apparatus, it is possible to reproduce the original data, by reproducing the sub data and the main data and by using the reproduced sub data and the reproduced main data.

The above object of the present invention can be also achieved by an information reproducing method of reproducing information recorded on the above-described information recording medium (including its various aspects), the information reproducing method provided with: a reading process of reading the record mark recorded on the information recording medium; a read signal generating process of generating a read signal for indicating the variable length of the record mark on the basis of an output signal in the reading process; a first data reproducing process of reproducing the first data on the basis of the read signal; a wobble signal generating process of generating a wobble signal for indicating the displaced position of the record mark on the basis of the output signal in the reading process; a second data reproducing process of reproducing the second data from the generated wobble signal; and an original data reproducing process of reproducing the original data by using the reproduced first data and the reproduced second data.

According to the information reproducing method, in the same manner as the above described information reproducing apparatus of the present invention, it is possible to reproduce the original data by combining the reproduced first data and the reproduced second data.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The preferred embodiments of the present invention will be explained with reference to the drawings hereinafter.

1. First Embodiment

1-1. Basic Structure of Optical Disc

Figure 1:
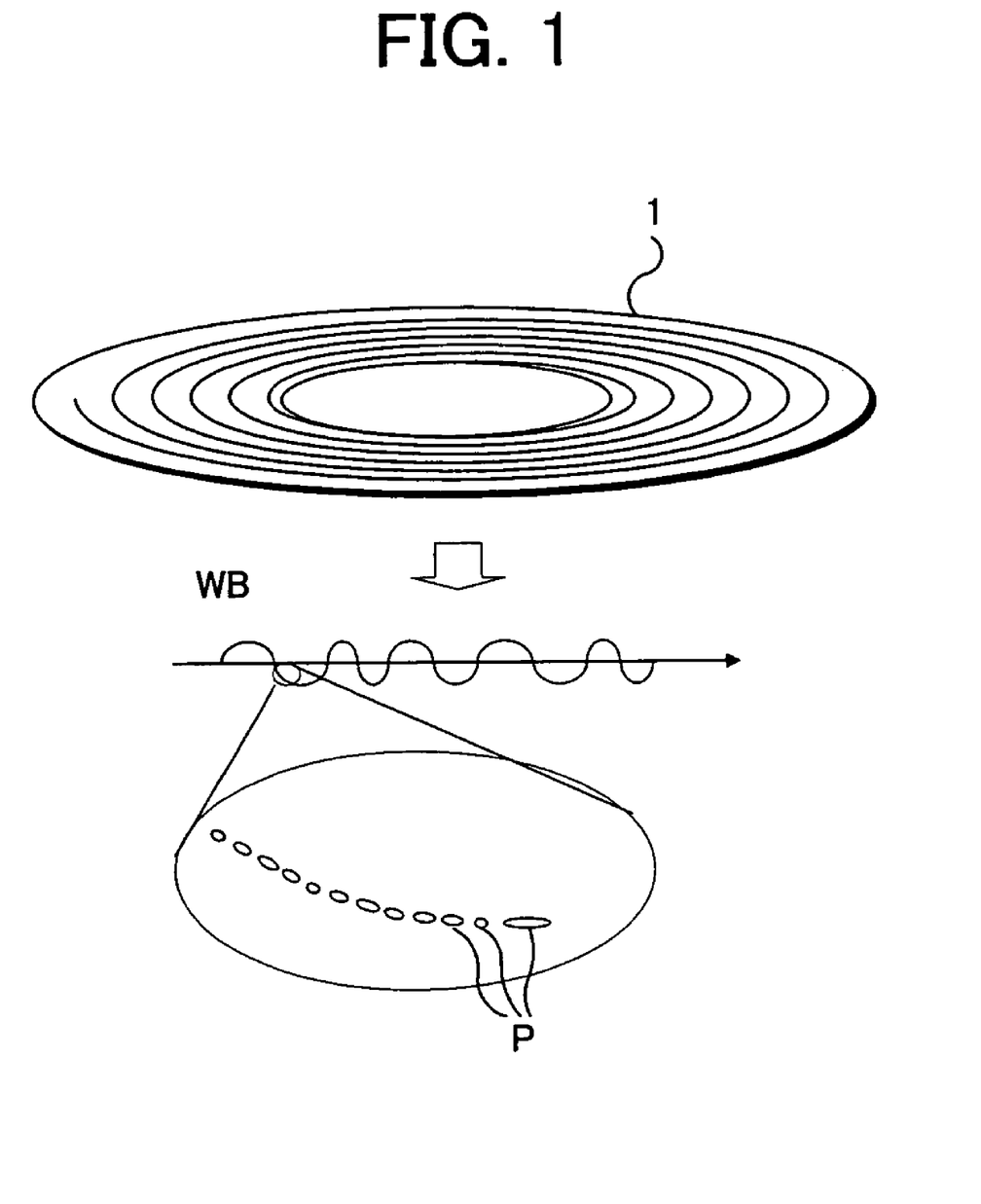
FIG. 1 is an explanatory diagram showing tracks formed on a master disc DS.

In the first embodiment, a DVD is taken and explained as one example of the information recording medium, but it is to be understood that the present invention is not limited to the first embodiment. FIG. 1 shows tracks formed on an optical disc 1. On the optical disc 1, record marks are formed along circular tracks as pits P. Pit data DP is recorded according to the variable length (i.e. the long or short length) of the record mark. The track, in close-up, meanders or wobbles in the direction crossing a reading direction. The meandering or wobbling of the track is referred to as the "wobble" and has a shape corresponding to a wobble signal WB. The wobble signal WB is generated on the basis of wobble data DW. Namely, in addition to the pit data DP, the wobble data DW is superposedly or redundantly recorded by the meandering or wobbling of the record mark on the optical disc 1.

Figure 2:
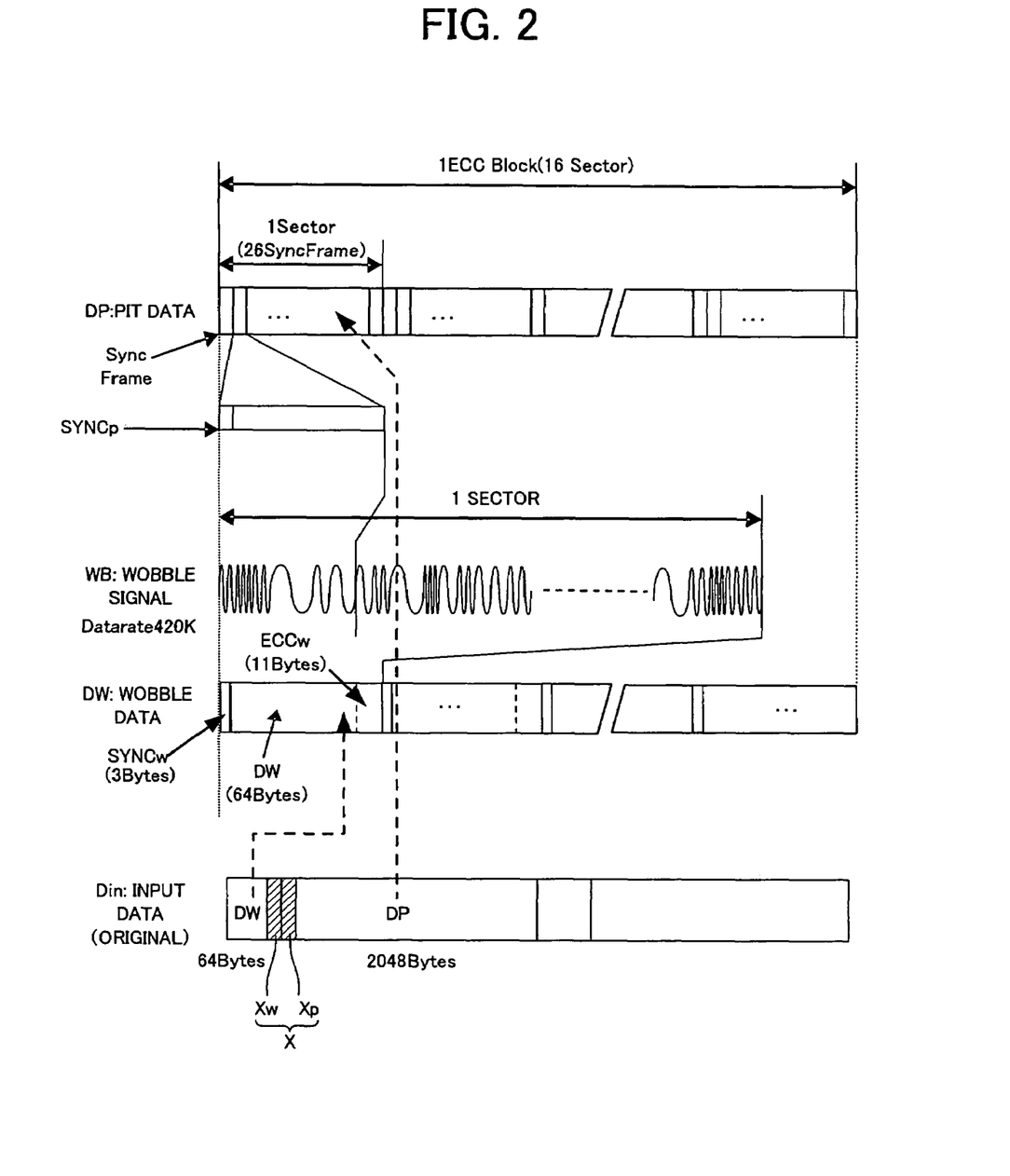
FIG. 2 is an explanatory diagram showing the data formats of pit data DP and wobble data DW associated with a first embodiment of the present invention.

FIG. 2 shows the data formats of the pit data DP and the wobble data DW. In the first embodiment, the data unit of the pit data DP to which an error-correcting code ECCp is appended is referred to as an ECC block. As shown in FIG. 2, one ECC block includes 16 sectors, and one sector includes 26 synchronization frames. A pit synchronization signal SYNCp is placed at the head of the synchronization frame. Correspondingly to one sector of the pit data DP, 3 bytes of a wobble synchronization signal SYNCw and 11 bytes of an error-correcting code ECCw are provided in one sector of the wobble data DW which is 64 bytes. As shown in FIG. 2, the wobble synchronization signal SYNCw is placed at the head of one sector of the wobble data DW.

The disc master of the optical disc 1 is made by a mastering apparatus as described later. The constitutional unit of input data Din inputted to the mastering apparatus is 2048 bytes of data constituting one sector of the pit data DP, and 64 bytes of data constituting one sector of the wobble data DW. Namely, the input data Din is recorded with it divided into the pit data DP and the wobble data DW.

As the input data Din, data for indicating image and audio information or the like is used. The input data Din preferably includes management information about copyright, such as copy information. As shown in FIG. 2, the constitutional unit of the input data Din includes particular data X including the information for copy control, such as copyright. In the constitutional unit of the input data Din, the particular data X includes data Xp and data Xw. The data Xp is one portion of 2048 bytes of data constituting one sector of the pit data DP. The data Xw is one portion of 64 bytes of data constituting one sector of the wobble data DW. Namely, in the first embodiment, the particular data X is recorded in such a manner that it is divided as the pit data DP and the wobble data DW.

Thus, in order to reproduce the input data Din recorded on the optical disc 1, it is necessary to reproduce both of the pit data DP and the wobble data DW. Even if any one of the pit data DP and the wobble data DW is reproduced and the data obtained by the reproduction is used, it is impossible to reproduce the other. Therefore, since the reproduction of the input data Din becomes difficult, it is possible to greatly improve the concealment of the information recorded as the input data Din.

On the optical disc 1, a recording area for the input data Din can be reserved as a recording area for the pit data DP and a recording area for the wobble data DW. Conventionally, the image or audio information or the like is recorded as the length of the pit, for example. As compared with this, in the first embodiment, the image or audio information or the like is used as the information included in the input data Din, which allows the data capacity to be increased while ensuring the concealment thereof.

If both of the pit data DP and the wobble data DW are not reproduced, it is impossible to reproduce not only the input data Din but also the particular data X. Thus, it is possible to improve the concealment of the particular data X included in the input data Din. Therefore, it is possible to increase the concealment of the information for copy control included in the particular data X.

1-2. Entire Structure of Mastering Apparatus

Figure 3:
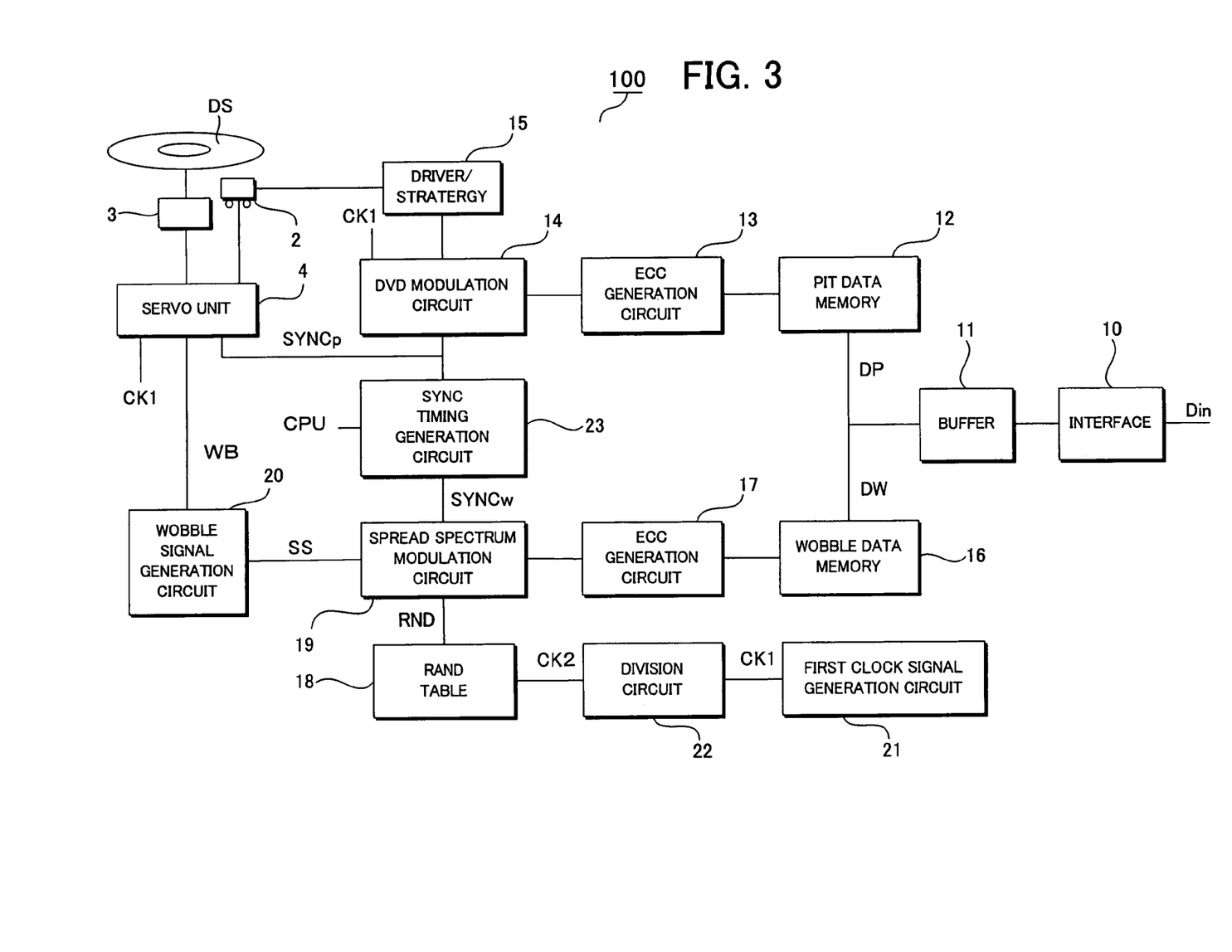
FIG. 3 is a block diagram showing the entire structure of a mastering apparatus associated with the first embodiment of the present invention.

FIG. 3 shows the entire structure of a mastering apparatus. A mastering apparatus 100 is intended to make a master disc DS for the optical disc 1 and is provided with: a recording unit 2; a spindle motor 3 for rotating the master disc DS; and a servo unit 4. The master disc DS is made as a glass master on which photoresist is applied, for example. The recording unit 2 is provided with: a laser diode for irradiating laser light; an optical system for focusing the laser light on the master disc DS; and a slider apparatus for moving the laser diode and the optical system as one body in the radial direction of the master disc DS. The laser diode emits the laser light with a power corresponding to a driving signal supplied from a driver 15. The slider apparatus moves the optical system and the laser diode in the radial direction of the master disc DS according to a control signal from the servo unit 4.

A first clock signal CK1 and the pit synchronization signal SYNCp are supplied to the servo unit 4. In synchronization with these signals, the servo unit 4 performs spindle servo for controlling the rotation of the spindle motor 3, focus servo for controlling the focus of the laser light, and slide servo for controlling the slider apparatus. In the slide servo out of them, the control signal is generated by adding a wobble signal WB to a signal for forming a spiral track, and the slider apparatus is controlled by the control signal.

The first clock signal CK1 is generated by a first clock signal generation circuit 21. In the first embodiment, the frequency of the first clock signal CK1 is 10.5 MHz. The first clock signal CK1 is a time reference for the pit data DP. A division circuit 22 frequency-divides the first clock signal CK1 and generates a second clock signal CK2 or the like. The frequency of the second clock signal CK2 is 420 KHz. The second clock signal CK2 is used for the generation of the wobble signal WB and is a time reference for it.

The input data Din is supplied from external equipment to the mastering apparatus 100. The input data Din is taken into a buffer 11 through an interface 10. The input data Din taken into the buffer 11 is divided into the pit data DP and the wobble data DW under the control of a Central Processing Unit (CPU), and they are transferred to a pit data memory 12 and a wobble data memory 16, respectively. The CPU performs a dividing process according to a predetermined rule. In the first embodiment, the CPU transfers 64 bytes of data starting from the head of the input data Din to the wobble data memory 16 as the wobble data DW, while transferring 2048 bytes of data following the above data to the pit data memory 12.

The CPU reads the pit data DP from the pit data memory 12 and supplies it to an Error-Correcting Code (ECC) generation circuit 13. After scrambling in which the data order of the pit data DP is rearranged according to a preset rule, the ECC generation circuit 13 generates the error-correcting code ECCp and appends it to the pit data DP. A DVD modulation circuit 14 generates the pit data DP by modulating the output data of the ECC generation circuit 13. The pit synchronization signal SYNCp generated on a SYNC timing generation circuit 23 is appended to the pit data DP.

In the meantime, the wobble data DW stored in the wobble data memory 16 is read from there and supplied to an ECC generation circuit 17 under the control of the CPU. After scrambling in which the data order of the wobble data DW is rearranged, the ECC generation circuit 17 appends the error-correcting code ECCw generated on the basis of the wobble data DW.

A random pattern used for spread spectrum is stored on a RAND table 18. The random pattern corresponds to a spread code and is a bit row generated by using a random function. The second clock signal CK2 is supplied to the RAND table 18. The random pattern is read in synchronization with the second clock signal CK2. The read random pattern is supplied to a spread spectrum modulation circuit 19 as random data RND. After appending the wobble synchronization signal SYNCw to the wobble data DW, the spread spectrum modulation circuit 19 multiplies it with the random data RND, to thereby generate the spread spectrum data SS. The spread spectrum modulation circuit 19 can be constructed from an eXclusive OR (XOR) circuit, for example.

A wobble signal generation circuit 20 generates the wobble signal WB by band-limiting the spread spectrum data SS. In this case, the wobble signal generation circuit 20 can be constructed from a band pass filter, a low pass filter, or the like, for example.

The master disc DS on which the record mark is formed by the mastering apparatus 100 is developed to be a resist master. After that, one metal master is made through an electroforming process of plating on the basis of the resist master, and then a plurality of mothers are made from the one metal master. Furthermore, a plurality of stampers are made from the plurality of mothers. The optical disc 1 is produced by pressing resin, such as plastic, by using the stamper.

1-3. Information Reproducing Apparatus

Figure 4:
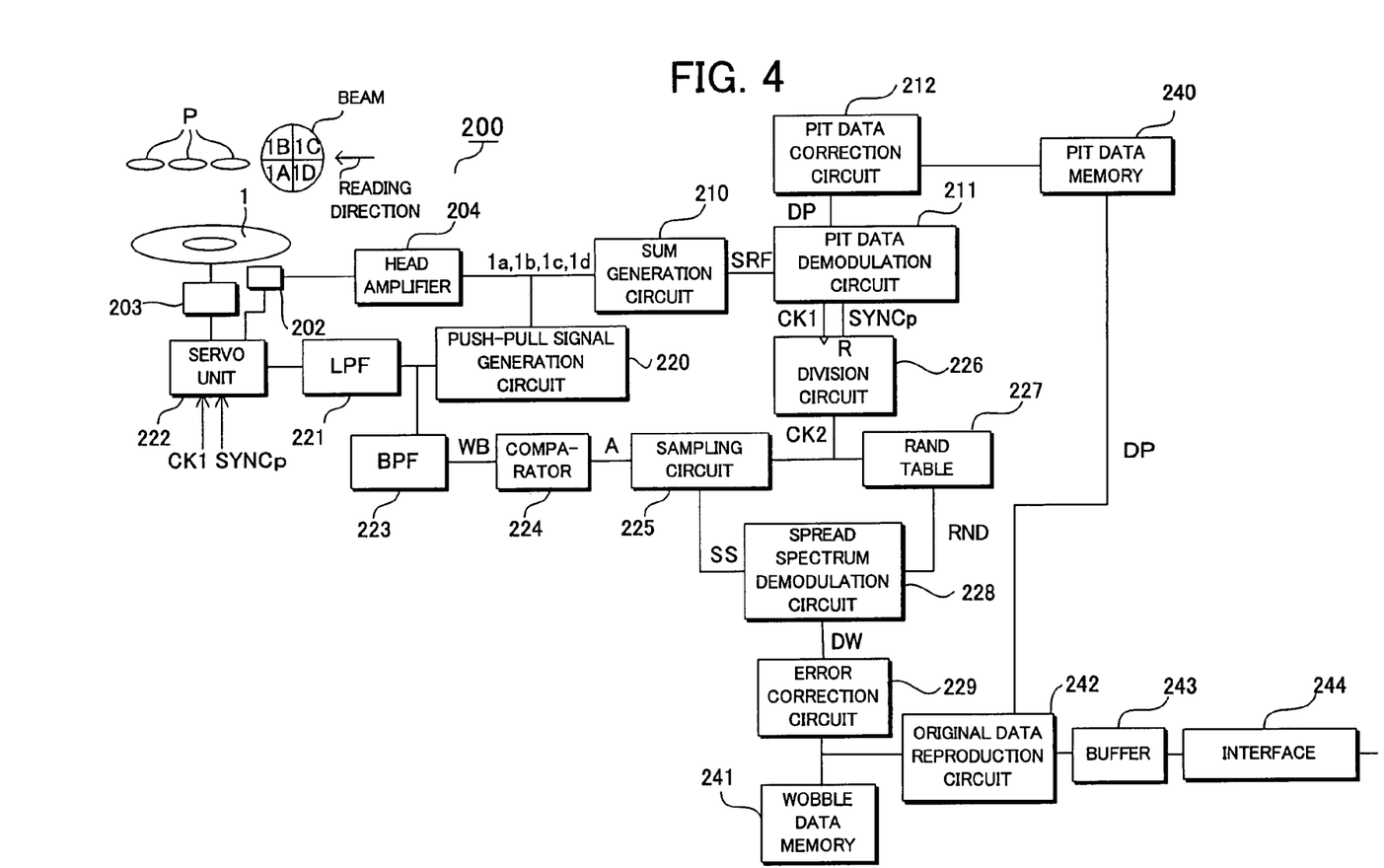
FIG. 4 is a block diagram showing the entire structure of an information reproducing apparatus associated with the first embodiment of the present invention.

Next, the information reproducing apparatus will be explained. FIG. 4 shows the entire structure of an information reproducing apparatus 200.

The information reproducing apparatus 200 is provided with: an optical pickup 202 for irradiating a reproduction beam onto the optical disc 1, which is the information recording medium, and for outputting a signal corresponding to reflected light; a spindle motor 203 for controlling the rotation of the optical disc 1; and a servo unit 222. The first clock signal CK1 and the pit synchronization signal SYNCp are supplied to the servo unit 222. In synchronization with these signals, the servo unit 222 performs spindle servo for controlling the rotation of the spindle motor 203 and focus servo and tracking servo for controlling the relative position of the optical pickup 202 with respect to the optical disc 1.

The optical pickup 202 is provided with: a laser diode for irradiating the reproduction beam; and a four-division detection circuit (not-illustrated). The four-division detection circuit divides by 4 the reflected light of the reproduction beam into areas 1A, 1B, 1C, and 1D shown in FIG. 4, and outputs each signal corresponding to the quantity of light in respective one of the areas. A head amplifier 204 amplifies each output signal of the optical pickup 202, and outputs a divisional read signal $1a$ corresponding to the area 1A, a divisional read signal $1b$ corresponding to the area 1B, a divisional read signal $1c$ corresponding to the area 1C, and a divisional read signal $1d$ corresponding to the area 1D. Incidentally, the optical pickup 202 and the head amplifier 204 correspond to the "reading device" described above.

A sum generation circuit 210 corresponds to the "read signal generating device" and is constructed from an addition circuit for adding the divisional read signals $1a$, $1b$, $1c$, and $1d$ and for outputting a sum read signal SRF. Incidentally, the sum read signal SRF represents the length of the record mark and corresponds to the above-described "read signal".

Figure 5:
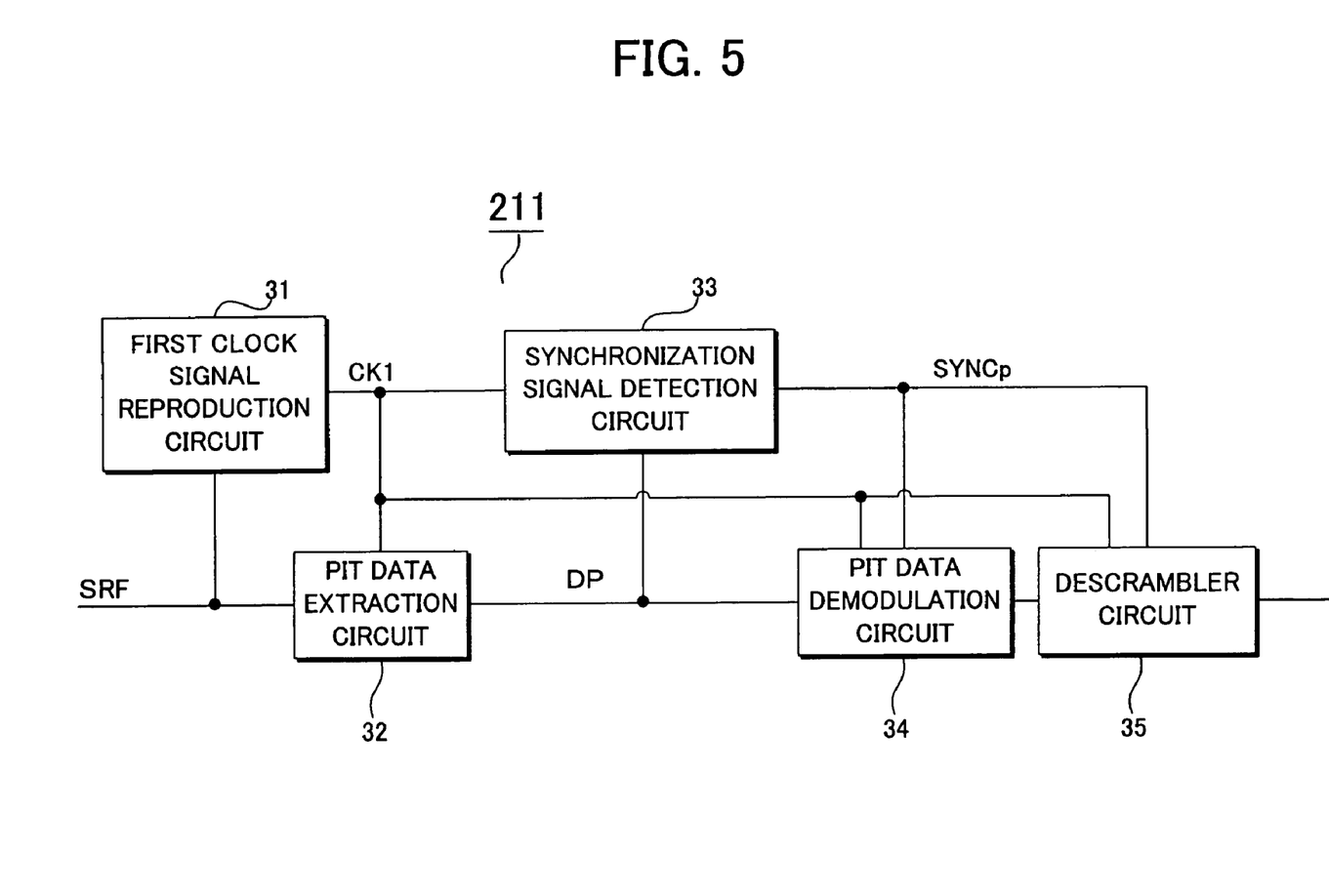
FIG. 5 is a block diagram showing the structure of a pit data demodulation circuit of the information reproducing apparatus.

A pit data demodulation circuit 211 reproduces the pit data DP and generates the first clock signal CK1 on the basis of the sum read signal SRF. The pit data demodulation circuit 211 corresponds to the above-described "first data reproducing device". FIG. 5 shows the structure of the pit data demodulation circuit 211. As shown in FIG. 5, the pit data demodulation circuit 211 is provided with: a first clock signal reproduction circuit 31; a pit data extraction circuit 32; a synchronization signal detection circuit 33; a pit data demodulation circuit 34; and a descrambler circuit 35.

The first clock signal reproduction circuit 31 reproduces the first clock signal CK1 synchronized with the pit data DP on the basis of the sum read signal SRF. The pit data extraction circuit 32 samples, with the first clock signal CK1, a binary signal obtained by binarizing the sum read signal SRF and reproduces the pit data DP.

The synchronization signal detection circuit 33 detects a synchronization pattern included in the reproduced pit data DP and generates the pit synchronization signal SYNCp. The synchronization pattern is a particular data pattern which is not included in other pit data, and has a constant cycle. The pit synchronization signal SYNCp indicates the timing of the synchronization pattern.

The pit data demodulation circuit 34 generates reproduction data by demodulating the reproduced pit data DP with a predetermined table, with the pit synchronization signal SYNC being as a reference position. For example, if Eight to Fourteen Modulation (EFM) is used as a modulating method, the demodulation processing is performed in which 14 bits of the pit data DP is converted into 8 bits of the reproduction data. The descrambler circuit 35 performs descrambling in which the order of the reproduction data is rearranged according to a preset rule, and outputs the processed reproduction data.

The reproduction data obtained in this manner is supplied to a pit data error correction circuit 212 shown in FIG. 4, and after error correcting and interpolating therein, it is stored into a pit data memory 240.

Back in FIG. 4, the explanation goes on. A push-pull signal generation circuit 220 calculates $(1a+1d)-(1b+1c)$ and generates a push-pull signal. The component $(1a+1d)$ corresponds to the areas 1A and 1D which are on the left side with respect to the reading direction, while the component $(1b+1c)$ corresponds to the areas 1B and 1C which are on the right side with respect to the reading direction. Namely, if the reproduction beam inclines to the left side with respect to the pit, the push-pull signal will have positive polarity with the amplitude center thereof as a standard. If the reproduction beam is positioned in the center of the pit, the value of the push-pull signal will be in the amplitude center thereof. If the reproduction beam inclines to the right side with respect to the pit, the push-pull signal will have negative polarity with the amplitude center thereof as a standard. The relative position between the reproduction beam and the pit changes according to the meandering or wobbling of the track, and the value of the push-pull signal represents the relative position between the reproduction beam and the pit. Namely, the push-pull signal is a signal corresponding to the meandering or wobbling of the track.

The push-pull signal is outputted through a low pass filter 221 to the servo unit 222. The servo unit 222 performs tracking control on the basis of the push-pull signal. Moreover, the push-pull signal is supplied to a band pass filter 223. The pass band of the band pass filter 223 is set to extract the wobble signal WB obtained by the spread spectrum modulation of the wobble data DW upon recording from the push-pull signal. Therefore, the band pass filter 223 constitutes the "wobble signal generating device" described above with the push-pull signal generation circuit 220, and the output signal of the band pass filter 223 is such as to reproduce the wobble signal WB from the optical disc 1.

Figure 6:
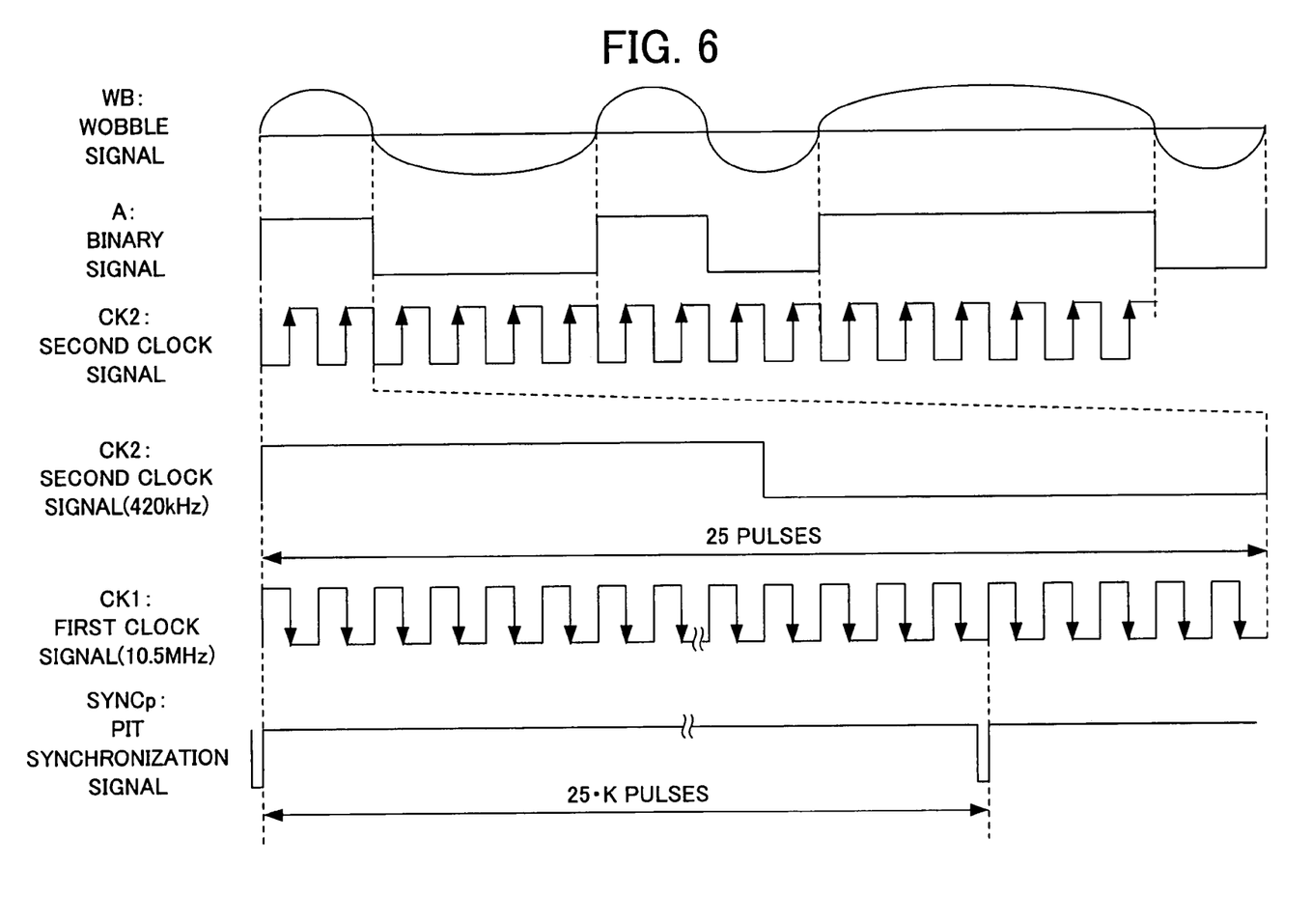
FIG. 6 is a timing chart of a wobble signal WB, a binary signal A, a first clock signal CK1, a second clock signal CK2, and a pit synchronization signal SYNCp.

FIG. 6 shows a timing chart of the wobble signal WB, a binary signal A, the first clock signal CK1, the second clock signal CK2, and the pit synchronization signal SYNCp. A comparator 224 outputs the binary signal A obtained by binarizing the wobble signal WB. Since the wobble signal WB has a low frequency, the inclination thereof near zero crossing is relatively mild. Thus, the binary signal A has a large jitter component. A sampling circuit 225 samples the binary signal A by using the second clock signal CK2 and extracts the data, to thereby reproduce the spread spectrum data SS.

In the first embodiment, the frequency f1 of the first clock signal CK1 is 10.5 MHz and the frequency f2 of the second clock signal CK2 is 420 KHz. Thus, a division circuit 226 generates the second clock signal CK2 by frequency-dividing the first clock signal CK1 by 25. Therefore, as shown in FIG. 6, one cycle of the second clock signal CK2 can contain therein 25 first clock signals CK1. The division circuit 226 is set to be reset if the voltage of a reset terminal R is active (at a low level), and the pit synchronization signal SYNCp is supplied to the reset terminal R. Therefore, the second clock signal CK2 is reset by the trailing of the pit synchronization signal SYNCp, and its phase is determined from the pit synchronization signal SYNCp.

The synchronization patterns are inserted in the pit data DP with a cycle of 25×K (K: natural number) bits, and each has such a relationship that the beginning of the synchronization pattern agrees with the leading or rising edge of the second clock signal CK2. Namely, the synchronization pattern has a frequency which is a natural multiple of that of the second clock signal CK2. In this case, if the pit synchronization signal SYNC becomes active at the timing shown in FIG. 6, the division circuit 226 is reset and the phases of the pit synchronization signal SYNCp and the second clock signal CK2 are adjusted. This makes it possible to adjust the occurrence timing of the leading edge of the second clock signal CK2 by using the first clock signal CK1 with a higher frequency. Therefore, even if the edge of the binary signal A is influenced and wobbled by jitter, it is possible to certainly extract the spread spectrum data SS.

Back in FIG. 4, the explanation goes on. A random pattern used for the spread spectrum modulation upon recording is stored on a RAND table 227. The random pattern corresponds to a spread code and is a bit row generated by using a random function. The second clock signal CK2 is supplied to the RAND table 227. By reading the random pattern in synchronization with the second clock signal CK2, the random data RND is generated. The generated random data RND is supplied to a spread spectrum demodulation circuit 228. Moreover, the spread spectrum data SS outputted from the sampling circuit 225 is supplied to the spread spectrum demodulation circuit 228. The spread spectrum data SS is multiplied with the random data RND, thereby to reproduce the wobble data DW. In this case, a signal which is not in an original signal band is converted into a signal which is out of the band by the multiplication. The wobble data DW reproduced in this manner is error corrected on an error correction circuit 229 and is stored into a wobble data memory 241. Incidentally, the comparator 224, the sampling circuit 225, the division circuit 226, the RAND table 227, and the spread spectrum demodulation circuit 228 constitute the above-described "second data reproducing device".

On the information reproducing apparatus 200, the CPU which is not illustrated in FIG. 4 reads the pit data DP from the pit data memory 240 and the wobble data DW from the wobble data memory 241, and supplies them to an original data reproduction circuit 242. The original data reproduction circuit 242 corresponds to the "original data reproducing device" and reproduces the input data Din used upon recording by combining the pit data DP and the wobble data DW. The reproduced data is stored into a buffer 213. An interface 214 sequentially reads the data stored in the buffer 213, converts it into a predetermined output form, and outputs it to external equipment.

2. Second Embodiment 2-1: Basic Structure of Optical Disc

In the second embodiment, as with the structure of the optical disc 1 shown in FIG. 1, the pit data DP is recorded according to the length of the record mark on the optical disc 1. On the other hand, in addition to the pit data DP, the wobble signal WB is superposedly or redundantly recorded by the meandering or wobbling of the record mark on the optical disc 1.

Figure 7:
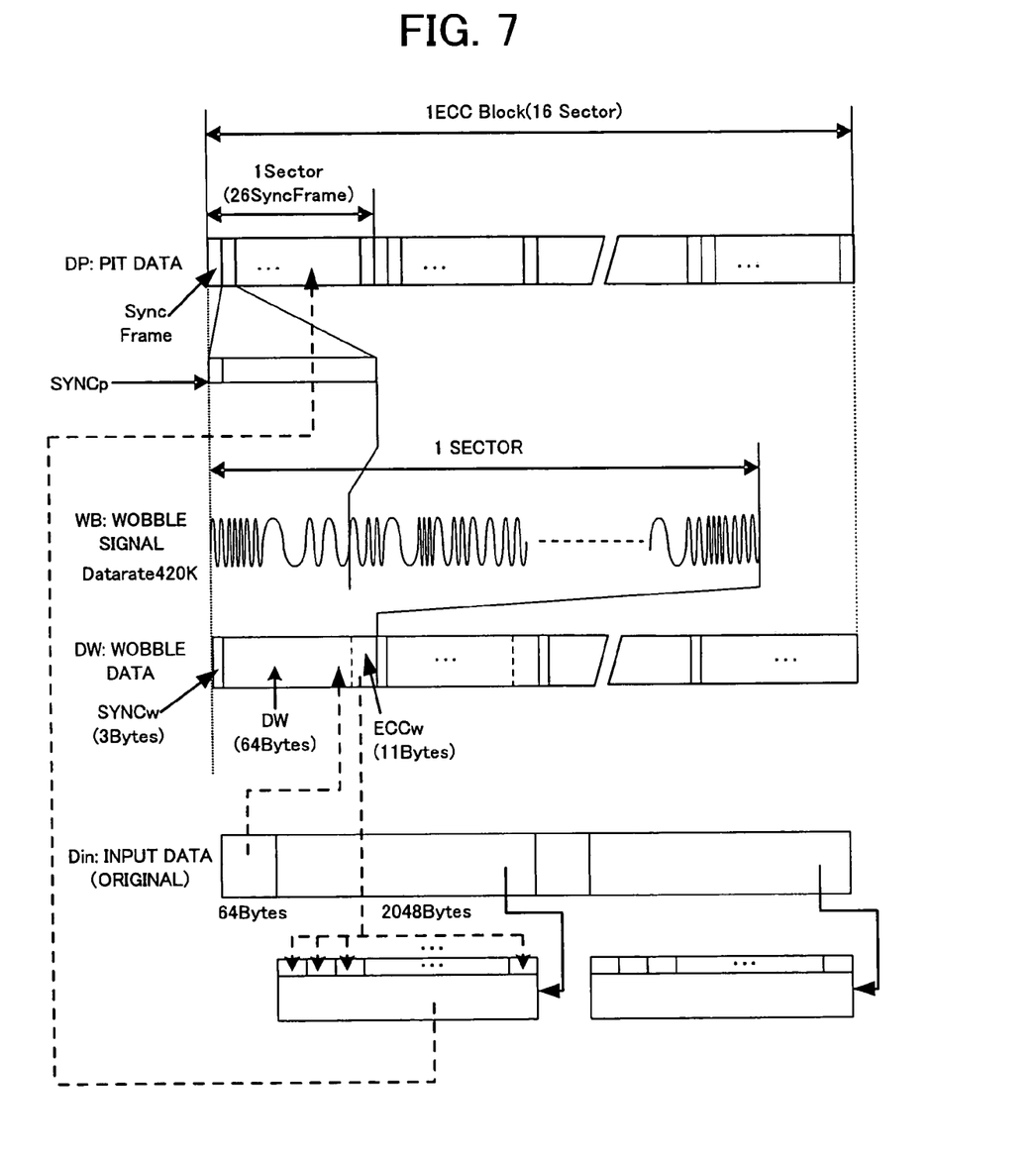
FIG. 7 is an explanatory diagram showing the data formats of pit data DP and wobble data DW associated with a second embodiment of the present invention.

FIG. 7 shows the data formats of the pit data DP and the wobble data DW. In the second embodiment, the structure of the wobble data DW is the same as that of the wobble data DW shown in FIG. 2, and the detailed structure of the pit data DP is different from that of the pit data DP shown in FIG. 2.

In the second embodiment, with regard to the constitutional unit of the input data Din, 2048 bytes of data constituting one sector of the pit data DP is used as the main data, and 64 bytes of data constituting one sector of the wobble data DW is used as the sub data. The main data in the constitutional unit of the input data Din is converted on the basis of at least one portion of the error-correcting code ECCw provided for the corresponding wobble data DW, and the converted data is recorded onto the optical dsic 1 as the pit data DP. The error-correcting code ECCw corresponds to the above-described "data for conversion" because it is obtained by performing a predetermined operation with respect to the sub data. As shown in FIG. 7, the pit data DP is generated by performing a predetermined operation by using one byte of Most Significant Bit (MSB) and the error-correcting code ECCw of the wobble data DW for each byte with respect to the main data, and it is recorded onto the optical disc 1. Incidentally, the predetermined operation may be an operation for calculating exclusive OR, for example.

Thus, in order to reproduce the input data Din from the optical disc 1, firstly, it is necessary to reproduce the wobble data DW as well as the pit data DP. Moreover, if the pit data DP is not reverse-converted on the basis of the error-correcting code ECCw, which is obtained by the reproduction of the wobble data DW and which is appended to the wobble data DW, it is impossible to reproduce the input data Din. As described above, a process for reproducing the input data Din becomes more complicated, which makes it difficult to reproduce the input data Din. As a result, it is possible to further improve the concealment of the input data Din.

2-2. Entire Structure of Mastering Apparatus

A mastering apparatus in the second embodiment has the same structure of the mastering apparatus 100 in the first embodiment shown in FIG. 3, except being further provided with a pit data conversion circuit 24. Thus, only the pit data conversion circuit 24 will be explained with reference to FIG. 8 with regard to the mastering apparatus in the second embodiment.

Figure 8:
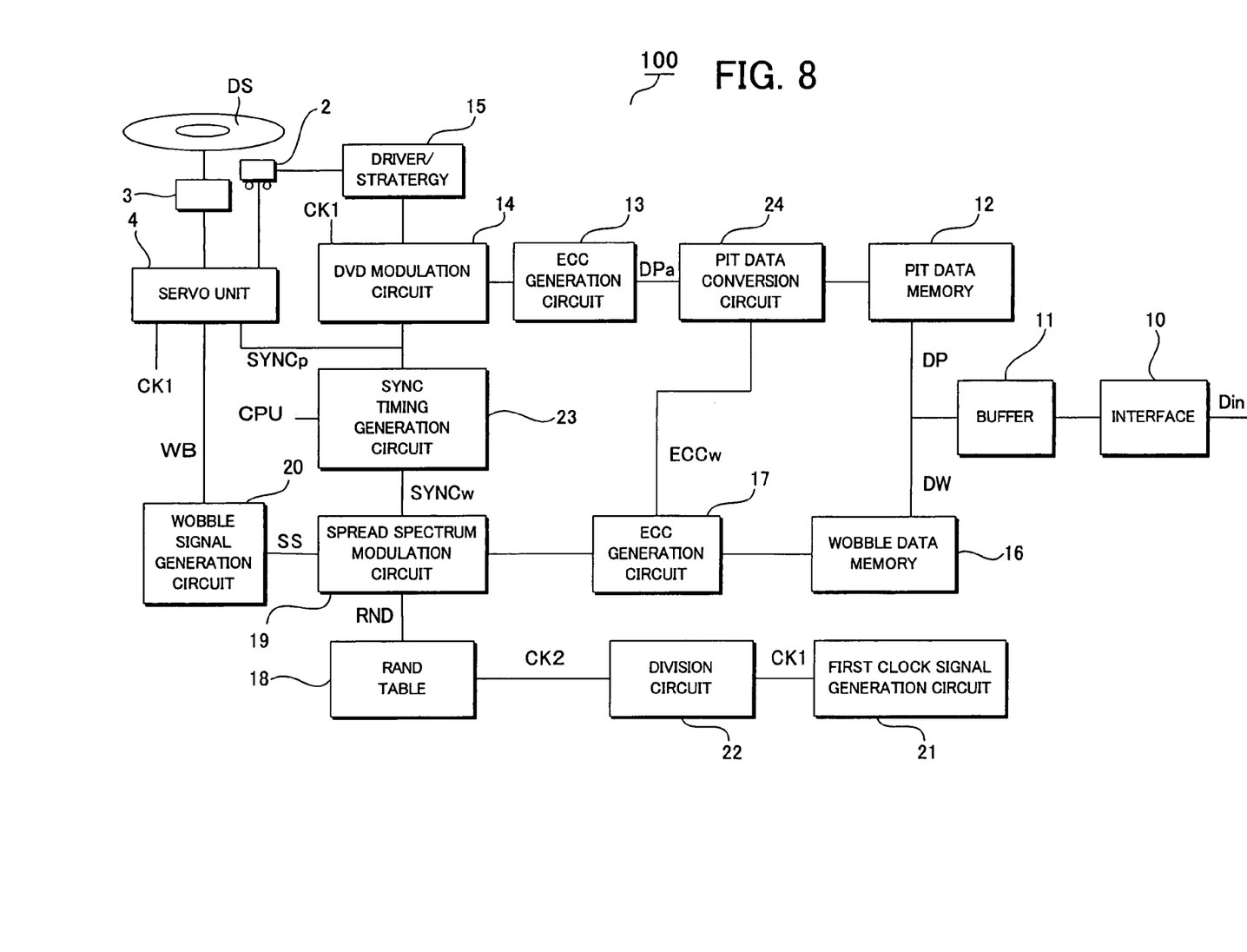
FIG. 8 is a block diagram showing the entire structure of a mastering apparatus associated with the second embodiment of the present invention.

The input data Din taken into the buffer 11 is divided into the main data DP and the wobble data DW which is the sub data under the control of the CPU, and they are transferred to the pit data memory 12 and the wobble data memory 16, respectively.

The CPU reads the main data DP from the pit data memory 12 and supplies it to the pit data conversion circuit 24. The pit data conversion circuit 24 performs a predetermined operation by using one byte of the MSB and the error-correcting code ECCw of the wobble data DW, which is supplied from the ECC generation circuit 17, for each byte with respect to the main data DP and converts the main data DP, to thereby generate the pit data DP. Then, pit data DPa outputted from the pit data conversion circuit 24 is inputted to the ECC generation circuit 13.

As described above, the pit data DPa can be obtained by converting the main data DP on the basis of the error-correcting code ECCw generated in recording the wobble data DW. As described above, if the error-correcting code ECCw of the wobble data DW is used for the data for conversion of the main data DP, it is possible to generate the pit data DPa after the data for conversion of the main data DP is obtained without any special processing, and it is possible to record the pit data DPa and the wobble data DW.

2-3. Entire Structure of Information Reproducing Apparatus

An information reproducing apparatus in the second embodiment has the same structure as that of the information reproducing apparatus 200 in the first embodiment shown in FIG. 4, except being further provided with a pit data reverse conversion circuit 251. Thus, only the pit data reverse conversion circuit 251 will be explained with reference to FIG. 9 with regard to the information reproducing apparatus in the second embodiment.

Figure 9:
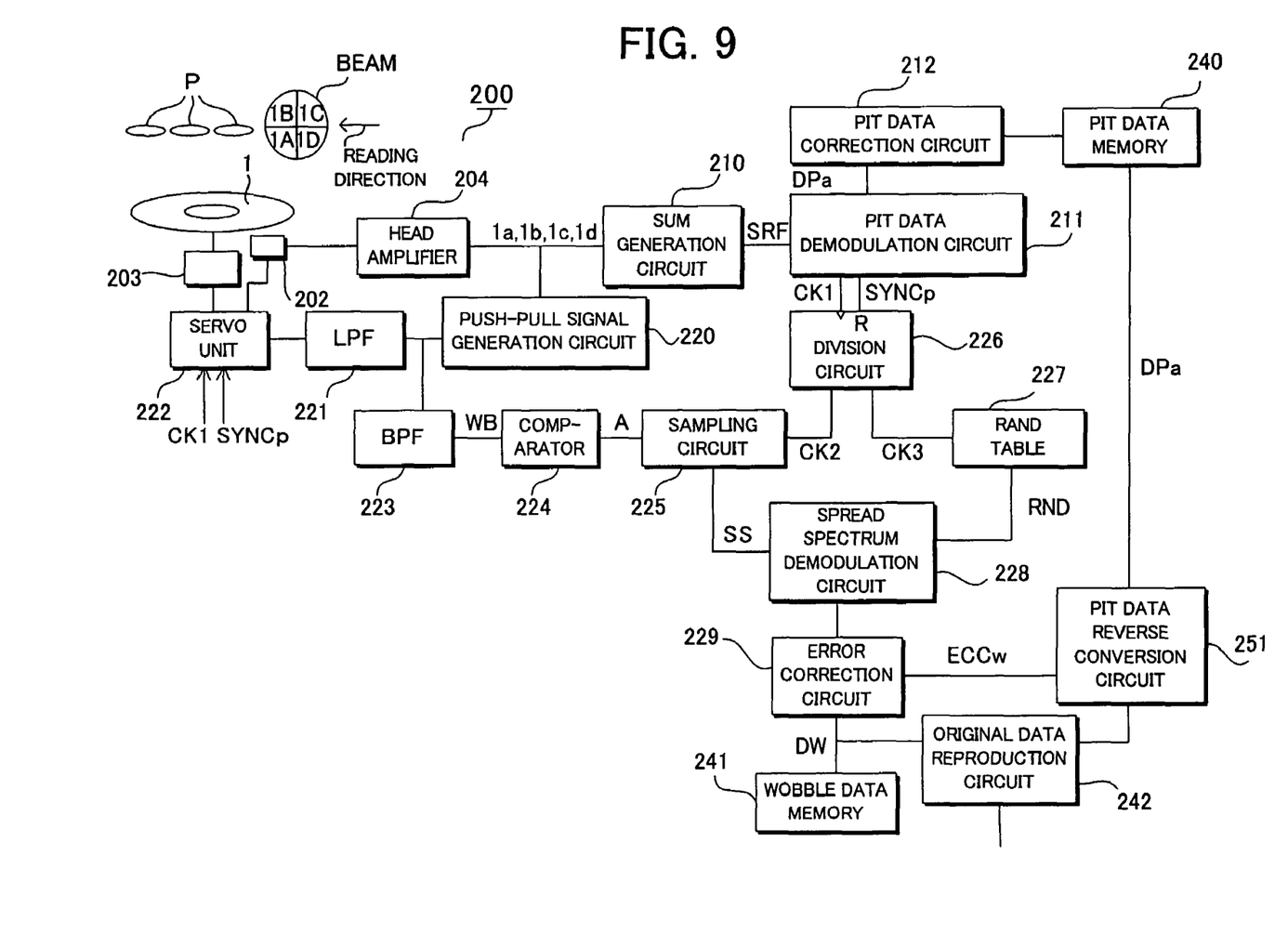
FIG. 9 is a block diagram showing the entire structure of an information reproducing apparatus associated with the second embodiment of the present invention.

The pit data DPa is reproduced by the pit data demodulation circuit 211 and stored into the pit data memory 240.

The pit data reverse conversion circuit 251 performs a predetermined operation by using the error-correcting code ECCw of the wobble data DW outputted from the error correction circuit 229 and the pit data DPa read from the pit data memory 240 by the CPU which is not illustrated in FIG. 9. As a result, the pit data DPa is reverse-converted, so that the main data DP is obtained.

Then, an original data reproduction circuit 442 reproduces the original data by combining the wobble data DW, which is the sub data read from the wobble data memory 241, and the main data DP.

Incidentally, in the second embodiment, the pit data reverse conversion circuit 251 corresponds to the "reverse-converting device", and the original data reproduction circuit 442 corresponds to the "original data generating device". The pit data reverse conversion circuit 251 and the original data reproduction circuit 442 constitute one example of the "original data reproducing device".

As described above, on the information reproducing apparatus 200 in the second embodiment, it is possible to reproduce the input data Din used for recording, by reproducing the wobble data DW, which is the sub data, and the main data DP and by using the reproduced wobble data DW and the reproduced main data DP.

The present invention is not limited to the above-described embodiments, and can be modified as follows, for example. In the above-described first embodiment, the particular data X including the information for copy control, such as copyright, is recorded with it divided into the pit data DP and the wobble data DW. However, the particular data X may be recorded so that it is all included in the wobble data DW.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-186749 filed on Jun. 30, 2003 including the specification, claims, drawings and summary is incorporated herein by reference in its entirety.

What is claimed is:

1. An information recording medium on which first data is recorded according to a variable length of a record mark and on which the record mark is formed at a displaced position to which the record mark is displaced, in a direction crossing a reading direction, according to a signal obtained by modulating second data in a predetermined modulating method, wherein original data is recorded in such a manner that the original data is divided into the first data and the second data, the original data is divided into main data and sub data, data obtained by converting the main data on the basis of data for conversion obtained by performing a predetermined operation with respect to the sub data is recorded as the first data, and the sub data is recorded as the second data.

2. The information recording medium according to claim 1, wherein the original data includes particular data for indicating predetermined information, and the particular data is recorded in such a manner that the particular data is divided into the first data and the second data.

3. The information recording medium according to claim 2, wherein the particular data includes copyright management information.

4. The information recording medium according to claim 1, wherein the data for conversion includes at least one portion of an error-correcting code of the sub data.

5. An information reproducing apparatus for reproducing information recorded on an information recording medium, on which first data is recorded according to a variable length of a record mark and on which the record mark is formed at a displaced position to which the record mark is displaced, in a direction crossing a reading direction, according to a signal obtained by modulating second data in a predetermined modulating method, wherein original data is recorded in such a manner that the original data is divided into the first data and the second data, said information reproducing apparatus comprising:

a reading device for reading the record mark recorded on said information recording medium;

a read signal generating device for generating a read signal for indicating the variable length of the record mark on the basis of an output signal from said reading device;

a first data reproducing device for reproducing the first data on the basis of the read signal;

a wobble signal generating device for generating a wobble signal for indicating the displaced position of the record mark on the basis of the output signal from said reading device;

a second data reproducing device for reproducing the second data from the generated wobble signal; and an original data reproducing device for reproducing the original data by using the reproduced first data and the reproduced second data, wherein on said information recording medium, the original data is divided into main data and sub data, data obtained by converting the main data on the basis of data for conversion obtained by performing a predetermined operation with respect to the sub data is recorded as the first data, and the sub data is recorded as the second data, and said original data reproducing device comprises:

a reverse-converting device for reverse-converting the reproduced first data to thereby generate the main data by using the data for conversion which are generated by the sub data extracted from the reproduced second data; and an original data generating device for generating the original data by using the sub data extracted from the reproduced second data and the reverse-converted main data.

6. An information reproducing method of reproducing information recorded on an information recording medium, on which first data is recorded according to a variable length of a record mark and on which the record mark is formed at a displaced position to which the record mark is displaced, in a direction crossing a reading direction, according to a signal obtained by modulating second data in a predetermined modulating method, wherein original data is recorded in such a manner that the original data is divided into the first data and the second data, said information reproducing method comprising:

a reading process of reading the record mark recorded on said information recording medium;

a read signal generating process of generating a read signal for indicating the variable length of the record mark on the basis of an output signal in said reading process;

a first data reproducing process of reproducing the first data on the basis of the read signal;

a wobble signal generating process of generating a wobble signal for indicating the displaced position of the record mark on the basis of the output signal in said reading process;

a second data reproducing process of reproducing the second data from the generated wobble signal; and an original data reproducing process of reproducing the original data by using the reproduced first data and the reproduced second data, wherein on said information recording medium, the original data is divided into main data and sub data, data obtained by converting the main data on the basis of data for conversion obtained by performing a predetermined operation with respect to the sub data is recorded as the first data, and the sub data is recorded as the second data, and said original data reproducing process comprises:

a reverse-converting process of reverse-converting the reproduced first data to thereby generate the main data by using the data for conversion which are generated by the sub data extracted from the reproduced second data; and an original data generating process of generating the original data by using the sub data extracted from the reproduced second data and the reverse-converted main data.

* * * * *